(12) United States Patent
Song et al.

(10) Patent No.: US 11,401,406 B2
(45) Date of Patent: Aug. 2, 2022

(54) POLYETHYLENE RESIN COMPOSITION

(71) Applicant: LG Chem, Ltd., Seoul (KR)

(72) Inventors: Jisoo Song, Daejeon (KR); Chang Hwan Jang, Daejeon (KR); Hyojoon Lee, Daejeon (KR); Yi Young Choi, Daejeon (KR); Sun Mi Kim, Daejeon (KR)

(73) Assignee: LG Chem, Ltd.

( * ) Notice: Subject to any disclaimer, the term of this patent is extended or adjusted under 35 U.S.C. 154(b) by 163 days.

(21) Appl. No.: 16/976,179

(22) PCT Filed: Feb. 18, 2020

(86) PCT No.: PCT/KR2020/002274
§ 371 (c)(1),
(2) Date: Aug. 27, 2020

(87) PCT Pub. No.: WO2020/171525
PCT Pub. Date: Aug. 27, 2020

(65) Prior Publication Data
US 2020/0407538 A1 Dec. 31, 2020

(30) Foreign Application Priority Data

Feb. 20, 2019 (KR) .................. 10-2019-0020022
Feb. 12, 2020 (KR) .................. 10-2020-0017052

(51) Int. Cl.
C08L 23/08 (2006.01)
D01D 5/42 (2006.01)
D01F 6/04 (2006.01)

(52) U.S. Cl.
CPC ............ C08L 23/0815 (2013.01); D01D 5/42 (2013.01); D01F 6/04 (2013.01); C08L 2205/025 (2013.01); C08L 2205/16 (2013.01); C08L 2207/062 (2013.01)

(58) Field of Classification Search
CPC ............ C08L 2205/025; C08L 23/06; C08L 23/0815
See application file for complete search history.

(56) References Cited

U.S. PATENT DOCUMENTS

| | | | |
|---|---|---|---|
| 4,547,551 A | 10/1985 | Bailey et al. | |
| 5,530,065 A | 6/1996 | Farley et al. | |
| 5,981,664 A | 11/1999 | Neumann et al. | |
| 2006/0025530 A1 | 2/2006 | Starita | |
| 2009/0036610 A1* | 2/2009 | Jaker ............ | C08L 23/0815 525/240 |
| 2009/0246433 A1 | 10/2009 | Michie et al. | |
| 2010/0016526 A1 | 1/2010 | Etherton et al. | |
| 2012/0028101 A1 | 2/2012 | Ishihara et al. | |
| 2014/0256883 A1 | 9/2014 | Michie, Jr. et al. | |
| 2016/0083539 A1 | 3/2016 | Wang et al. | |
| 2018/0016370 A1 | 1/2018 | You et al. | |
| 2018/0100061 A1 | 4/2018 | Yamaguchi et al. | |

FOREIGN PATENT DOCUMENTS

| | | |
|---|---|---|
| EP | 0273284 A2 | 7/1988 |
| EP | 2428525 A2 | 3/2012 |
| JP | H10072538 A | 3/1998 |
| JP | 3874869 B2 | 1/2007 |
| JP | 3929149 B2 | 6/2007 |
| JP | 2013136679 A | 7/2013 |
| JP | 2018517832 A | 7/2018 |
| KR | 19990029057 A | 4/1999 |
| KR | 20070100294 A | 10/2007 |
| KR | 20090014329 A | 2/2009 |
| KR | 20100121449 A | 11/2010 |
| KR | 20120004402 A | 1/2012 |
| KR | 20160147638 A | 12/2016 |
| KR | 20170057395 A | 5/2017 |
| KR | 20180068715 A | 6/2018 |
| WO | 2010114672 A1 | 10/2010 |
| WO | 2010128826 A2 | 11/2010 |
| WO | 2016089311 A1 | 6/2016 |
| WO | 2018064435 A1 | 4/2018 |

OTHER PUBLICATIONS

International Search Report for Application No. PCT/KR2020/002274 dated May 29, 2020, 2 pages.
Extended European Search Report including Written Opinion for EP20759344.3 dated Jun. 16, 2021; 5 pages.

* cited by examiner

*Primary Examiner* — Jeffrey C Mullis
(74) *Attorney, Agent, or Firm* — Lerner, David, Littenberg, Krumholz & Mentlik, LLP

(57) ABSTRACT

The present disclosure relates to a polyethylene resin composition exhibiting excellent processability and bubble stability, which can provide a film or fiber having excellent physical properties through various processes. The polyethylene resin composition includes a first polyethylene resin having a density of 0.950 g/cm$^3$ to 0.960 g/cm$^3$, a weight average molecular weight of 80000 g/mol to 100000 g/mol and a molecular weight distribution of 3.3 to 4.0; and a second polyethylene resin having a density of 0.950 g/cm$^3$ to 0.960 g/cm$^3$, a weight average molecular weight of 500000 g/mol to 600000 g/mol and a molecular weight distribution of 1.3 to 2.0.

12 Claims, 2 Drawing Sheets

POLYETHYLENE RESIN COMPOSITION

CROSS-REFERENCE TO RELATED APPLICATIONS

This application is a national phase entry under 35 U.S.C. § 371 of International Application No. PCT/KR2019/002274 filed Feb. 18, 2020, which claims priority from Korean Patent Application No. 10-2019-0020022 filed Feb. 20, 2019, and Korean Patent Application No. 10-2020-0017052 filed Feb. 12, 2020, all of which are incorporated herein by reference.

BACKGROUND OF THE INVENTION

(a) Field of the Invention

The present disclosure relates to a polyethylene resin composition exhibiting excellent processability and bubble stability, which can provide a film or fiber having excellent physical properties through various processes.

(b) Description of the Related Art

Fibers made of a polyethylene resin, for example, flat yarn made of a high density polyethylene (HDPE) resin, are generally produced according to a method of cutting a polyethylene resin film to a certain width and stretching it.

The polyethylene resin film usable in this process may be a blown film or a cast film generally made of a polyethylene resin composition. However, depending on whether the polyethylene resin film is a blown film produced by a blow process or a cast film produced by a casting process, physical properties required for the polyethylene resin composition which is a raw material thereof are different.

For example, in the case of the blown film, the polyethylene resin composition needs to have high bubble stability due to the nature of the blow process. In the case of the cast film, it is necessary for the polyethylene resin composition to exhibit a relatively low viscosity and high processability.

However, since high bubble stability and high processability are properties that are difficult to be compatible with each other, a polyethylene resin or a composition thereof satisfying them at the same time is not known.

Therefore, previously, a resin composition for the blown film and a resin composition for the cast film have been separately prepared. As a result, it is true that overall productivity of the polyethylene resin composition and economical efficiency of the process were adversely affected.

Accordingly, the development of a polyethylene resin composition that simultaneously exhibits excellent processability and bubble stability, and enables preparation of a film or fiber having excellent physical properties through various processes such as a blow process or a casting process has been continuously requested.

SUMMARY OF THE INVENTION

Technical Problem

Therefore, there is provided a polyethylene resin composition exhibiting excellent processability and bubble stability, which can provide a film or fiber having excellent physical properties through various processes.

Technical Solution

According to the present disclosure, there is provided a polyethylene resin composition including a first polyethylene resin having a density of 0.950 g/cm$^3$ to 0.960 g/cm$^3$, a weight average molecular weight of 80000 g/mol to 150000 g/mol and a molecular weight distribution of 3.9 to 6.0; and a second polyethylene resin having a density of 0.950 g/cm$^3$ to 0.960 g/cm$^3$, a weight average molecular weight of 110000 g/mol to 300000 g/mol and a molecular weight distribution of 1.5 to 3.8.

According to the present disclosure, there is also provided a polyethylene resin film including the polyethylene resin composition.

In addition, there is provided a fiber including the polyethylene resin composition.

According to the present disclosure, there is also provided a method of preparing a fiber including the step of cutting and stretching the polyethylene resin film.

Advantageous Effects

Since the polyethylene resin composition according to the present disclosure includes two types of polyethylene resins having predetermined physical properties, it can simultaneously exhibit a relatively low viscosity in a processing region, and thus excellent processability and bubble stability. Therefore, when the polyethylene resin composition is used, a polyethylene resin film having excellent physical properties may be prepared through various processes such as a blow process or a casting process, and a fiber such as flat yarn may be prepared using the same.

DETAILED DESCRIPTION OF THE EMBODIMENTS

Figure 1:
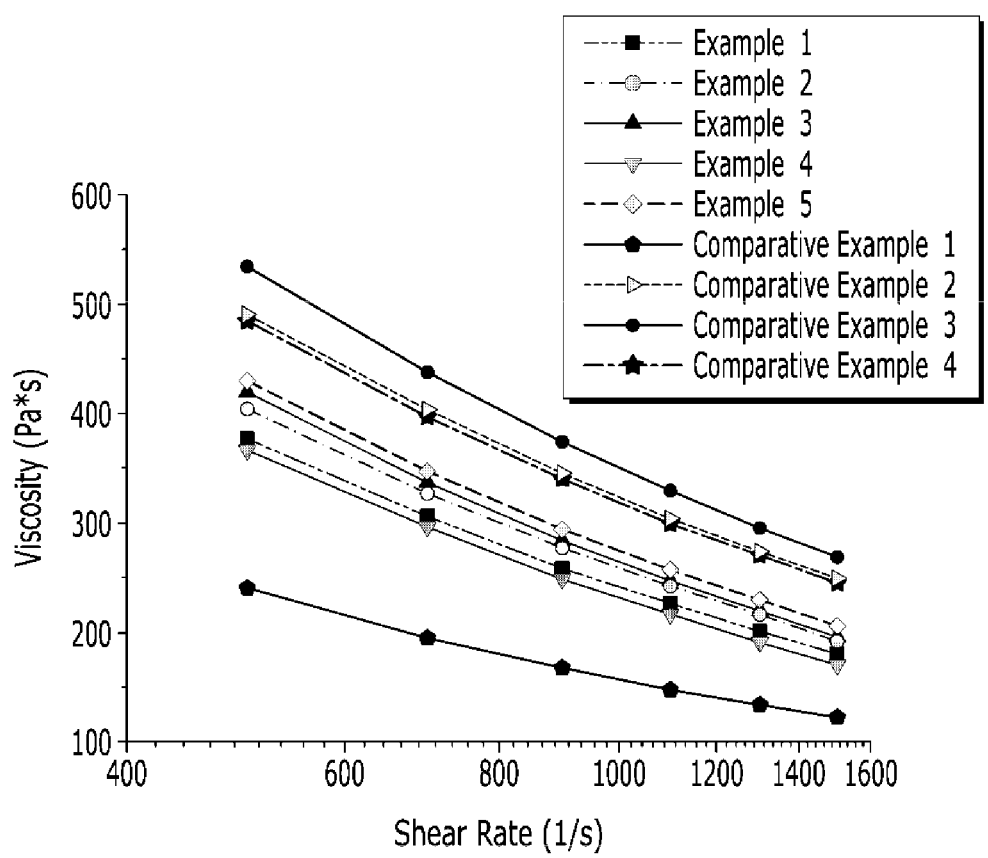
FIG. 1 is a graph showing the results of evaluating a viscosity by shear rate for the polyethylene resin compositions of Examples and Comparative Examples.

Hereinafter, a polyethylene resin composition according to a specific embodiment of the present disclosure will be described.

According to one embodiment of the present disclosure, there is provided a polyethylene resin composition including a first polyethylene resin having a density of 0.950 g/cm$^3$ to 0.960 g/cm$^3$, a weight average molecular weight of 80000 g/mol to 150000 g/mol and a molecular weight distribution of 3.9 to 6.0; and a second polyethylene resin having a density of 0.950 g/cm$^3$ to 0.960 g/cm$^3$, a weight average molecular weight of 110000 g/mol to 300000 g/mol and a molecular weight distribution of 1.5 to 3.8.

The present inventors have found through experiments that the polyethylene resin composition may have an appropriate viscosity which is not too high in a processing region, and as a result, may exhibit excellent processability suitable for a casting process by using a mixture of two types of polyethylene resins satisfying the predetermined physical properties. In addition, it has been confirmed that the resin composition may simultaneously exhibit high bubble stability suitable for a blow process due to the appropriate viscosity.

Unlike the conventional common sense, the polyethylene resin composition can exhibit excellent processability and bubble stability at the same time, because a resin having a high molecular weight such as the second polyethylene resin is mixed. In this case, the polyethylene resin composition may include a relatively high amount of polymer chains (by addition of the second polyethylene resin) in the high molecular weight region, while the overall resin composition can exhibit an overall low molecular weight and low viscosity corresponding to the first polyethylene resin. For this reason, the resin composition of one embodiment may exhibit a relatively low viscosity under the process conditions of the blow process, and may exhibit excellent bubble stability.

As the resin composition of one embodiment simultaneously exhibits excellent processability suitable for a casting process and high bubble stability suitable for a blow process, when the polyethylene resin composition is used, a polyethylene resin film having excellent physical properties may be prepared through various processes such as a blow process or a casting process, and a fiber such as flat yarn may be prepared using the same.

Hereinafter, the polyethylene resin composition of one embodiment will be described in more detail for each component.

In the polyethylene resin composition of one embodiment, the first polyethylene resin may have a density of 0.950 g/cm$^3$ to 0.960 g/cm$^3$, or 0.951 g/cm$^3$ to 0.955 g/cm$^3$, a weight average molecular weight of 80000 g/mol to 150000 g/mol, 85000 g/mol to 130000 g/mol, or 90000 g/mol to 110000 g/mol, and a molecular weight distribution of 3.9 to 6.0, 4.0 to 5.5, or 4.5 to 5.3.

As the first polyethylene resin satisfies these physical properties, it is possible to provide a polyethylene resin film and/or a fiber such as flat yarn having excellent physical properties, and in particular, the resin composition of one embodiment may have a viscosity suitable for a casting process which is not too high in a processing region.

In the polyethylene resin composition of one embodiment, the second polyethylene resin may have a density of 0.950 g/cm$^3$ to 0.960 g/cm$^3$, or 0.951 g/cm$^3$ to 0.955 g/cm$^3$, a weight average molecular weight of 110000 g/mol to 300000 g/mol, 120000 g/mol to 200000 g/mol, or 130000 g/mol to 150000 g/mol, and a molecular weight distribution of 1.5 to 3.8, 2.0 to 3.7, or 3.0 to 3.7.

As the second polyethylene resin satisfies these physical properties, the resin composition of one embodiment may include relatively many polymer chains in the high molecular weight region, and may exhibit excellent bubble stability suitable for a blow process.

Meanwhile, the above-described first polyethylene resin may be prepared and provided to have the above-described properties according to methods disclosed in the examples of published patent publication No. 2018-0068715, etc., or may be a resin satisfying the above-mentioned properties selected from commercially available resins such as SM250 (manufactured by LG Chem.). In addition, the above-described second polyethylene resin may be prepared and provided to have the above-described properties according to methods disclosed in the examples of published patent publication No. 2010-0121449, No. 2016-0147638, etc., or may be a resin satisfying the above-mentioned properties selected from commercially available resins such as SP380 (manufactured by LG Chem.).

The first and second polyethylene resins may be, for example, a copolymer of ethylene and an alpha olefin having 3 or more carbon atoms. In this case, the alpha olefin may be propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and a mixture thereof. Among them, the olefin polymer may be a copolymer of ethylene and 1-butene.

In addition, the resin composition of one embodiment may include the first and second polyethylene resins in a weight ratio of 80:20 to 90:10, 82:18 to 88:12, or 83:17 to 87:13. As a result, the resin composition of one embodiment has a further optimized viscosity range in a processing region, thereby exhibiting more improved processability in the casting process and better bubble stability.

The resin composition of one embodiment including the above-described first and second polyethylene resins may have a density of 0.950 g/cm$^3$ to 0.960 g/cm$^3$, or 0.951 g/cm$^3$ to 0.955 g/cm$^3$, and a melt index ($MI_{2.16}$) of 0.5 to 0.9, or 0.55 to 0.8 measured at a temperature of 230° C. under a load of 2.16 kg in accordance with ISO 1133.

In addition, the resin composition of one embodiment may have a $MI_5/MI_{2.16}$ value of 3.5 to 4.0, or 3.6 to 3.8, which is obtained by dividing a melt index ($MI_5$) measured at a temperature of 230° C. under a load of 5.0 kg in accordance with ISO 1133 by the $MI_{2.16}$.

By satisfying the above-described density range, it is possible to prepare a film and a fiber such as flat yarn exhibiting excellent physical properties with the resin composition of one embodiment. In addition, the resin composition can exhibit excellent processability in a casting process and excellent bubble stability in a blow process by satisfying the above-described properties such as melt index and melt index ratio.

In addition, the resin composition of one embodiment may have a weight average molecular weight of 110000 g/mol to 150000 g/mol, or 115000 g/mol to 140000 g/mol and a molecular weight distribution of 4.5 to 5.3 or 4.6 to 5.0 in terms of mechanical properties and processability of the film and/or fiber formed therefrom.

According to another embodiment of the present disclosure, there is provided a polyethylene resin film including the above-described polyethylene resin composition. The polyethylene resin film may be a cast film or a blown film.

As the film of another embodiment is prepared using the resin composition of one embodiment having excellent processability and bubble stability, it may have excellent overall physical properties and may be economically and effectively produced due to excellent processability and the like, regardless of the type of the film.

In addition, the film of another embodiment may be prepared by a conventional melt blow method or casting method after preparing the resin composition of one embodiment by mixing the above-described first and second polyethylene resins. However, the preparation method of the film is not limited to this, and a conventional preparation process of the film can be applied without any particular limitation. Thus, additional descriptions thereof will be omitted.

According to another embodiment of the present disclosure, there is provided a fiber including the polyethylene resin composition of the above embodiment.

The fiber may be in the form of flat yarn, etc., and may be prepared through the polyethylene resin film of another embodiment. For example, it may be prepared by a method of cutting and stretching the polyethylene resin film of another embodiment to a predetermined width.

However, the preparation method of the fiber is not limited to this, and a conventional preparation process of the fiber can be applied without any particular limitation. Thus, additional descriptions thereof will be omitted.

Hereinafter, the function and effect of the present invention will be described in more detail through specific examples. However, these examples are for illustrative purposes only, and the invention is not intended to be limited by these examples.

Examples 1 to 5 and Comparative Examples 1 to 4: Polyethylene Resin Composition

First, the polyethylene resin compositions of Examples and Comparative Examples were prepared using the polyethylene resins listed in Table 1 below. The weight average molecular weight, molecular weight distribution and density of these polyethylene resins were measured and evaluated in the same manner as in Test Example described below:

TABLE 1

| Product (Manufacturer) | Weight average molecular weight (g/mol) | Molecular weight distribution | Density (g/cm$^3$) |
|---|---|---|---|
| PE1 | SM250 (LG Chem.) | 100k | 5.0 | 0.952 |
| PE2 | SP380 (LG Chem.) | 140k | 3.7 | 0.952 |
| PE3 | SM100 (LG Chem.) | 110k | 10.9 | 0.952 |
| PE4 | SP360 (LG Chem.) | 120k | 3.6 | 0.946 |
| PE5 | E308 (Korea petrochem.) | 138k | 6.3 | 0.956 |
| PE6 | 3392 (Hanhwa Chem.) | 122k | 4.1 | 0.954 |

The polyethylene resin compositions of Examples 1 to 5 and Comparative Examples 1 to 4 were prepared by mixing the polyethylene resins of PE1 to PE6 with the contents listed in Table 2 below:

TABLE 2

| | Content (wt %) | | | | | |
|---|---|---|---|---|---|---|
| | PE1 | PE2 | PE3 | PE4 | PE5 | PE6 |
| Example 1 | 84 | 16 | 0 | 0 | 0 | 0 |
| Example 2 | 85 | 15 | 0 | 0 | 0 | 0 |
| Example 3 | 86 | 14 | 0 | 0 | 0 | 0 |
| Example 4 | 83 | 17 | 0 | 0 | 0 | 0 |
| Example 5 | 87 | 13 | 0 | 0 | 0 | 0 |
| Comp. Ex. 1 | 0 | 0 | 76 | 24 | 0 | 0 |
| Comp. Ex. 2 | 0 | 0 | 0 | 0 | 100 | 0 |
| Comp. Ex. 3 | 0 | 0 | 0 | 0 | 0 | 100 |
| Comp. Ex. 4 | 50 | 0 | 0 | 0 | 50 | 0 |

Test Example: Evaluation of Physical Properties

Physical properties of PE1 to PE6 used in Examples and Comparative Examples, the polyethylene resin compositions prepared in Examples and Comparative Examples and in the process of preparing a film therefrom were evaluated by the following methods:

(1) Density (g/cm$^3$): The density was measured according to ASTM D792.

(2) Molecular weight (Mw, Mn) and molecular weight distribution (Mw/Mn): The weight average molecular weight (Mw) and the number average molecular weight (Mn) were measured using gel permeation chromatography (GPC, manufactured by Water). They were measured using a Polymer Laboratories PLgel MIX-B 300 mm long column and PL-GPC220 instrument manufactured by Waters. At this time, a measurement temperature was 160° C., and 1,2,4-trichlorobenzene was used for a solvent at a flow rate of 1 mL/min. And the sample was supplied with a concentration of 10 mg/10 mL in an amount of 200 µL. Mw and Mn were obtained using a calibration curve formed using a polystyrene standard. 9 kinds of the polystyrene standard were used with the molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol.

The molecular weight distribution was calculated from Mw and Mn measured by the method described above.

(3) $MI_{2.16}$ and $MI_5/MI_{2.16}$: The melt index $MI_{2.16}$ and $MI_5$ were measured according to ISO 1133 (230° C., 2.16 kg or 5 kg load). From these results, $MI_5/MI_{2.16}$ was calculated.

(4) Evaluation of Viscosity by Shear Rate

The viscosity by shear rate was measured using a Goettfert Rheo-Tester 2000. The olefin copolymer melts were discharged through a capillary die (plane die, 180° angle) where a ratio (L/D) of length (L) to diameter (D) is 15. After equilibrating the sample at 240° C. for 5 minutes, the viscosity by shear rate was evaluated at the same temperature.

(5) Evaluation of Change in Complex Viscosity by Frequency

The complex viscosity by frequency was measured using an ARES-G2 rheometer manufactured by TA Instruments (New Castle, Delaway, USA). A sample for measurement was prepared to have a gap of 2.0 mm using parallel plates having a diameter of 25.0 mm at 190° C. The measurement was performed in the dynamic frequency sweep mode, at a 5% stain and a frequency ranged from 0.05 rad/s to 500 rad/s, a total of 41 points, 10 points in each decade. And complex viscosity values for each frequency were derived. Herein, power law fitting was performed using TA Orchestrator, a measuring program.

(6) Evaluation of Processing Load

The processing load was measured using a Teach Line E16 extruder manufactured by Collin. A sample for measurement was extruded at 240° C. and 200 rpm, and the processing load applied (A, Ampere) was measured.

(7) Evaluation of Die Deposit

When extruded at 240° C. and 200 rpm using a Teach Line E16 extruder from Collin, it was evaluated whether or not the die deposit was observed with the naked eye.

(8) Evaluation of Bubble Stability

When forming a film by a film blowing method, generated bubbles were evaluated by observing with the naked eye. It was evaluated as stable if the bubbles were not shaken and as unstable if they were shaken. The film formation was performed at a temperature of 150 to 250° C. and at a blow up ratio (BUR) of 1.2.

Figure 2:
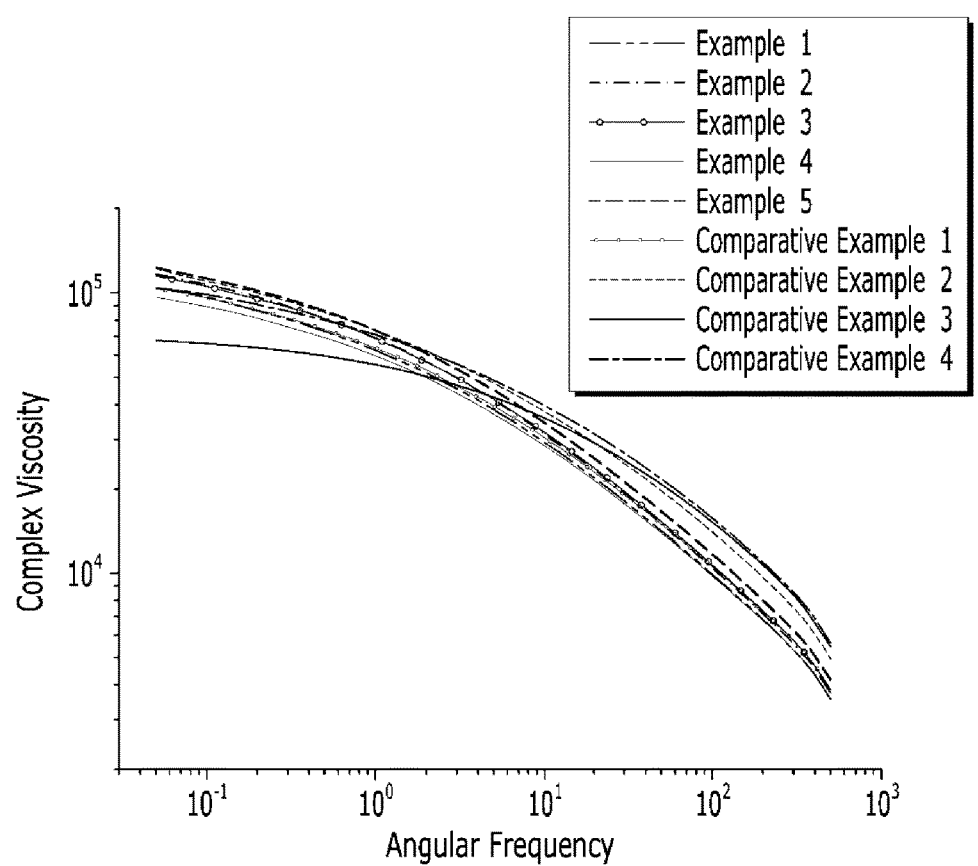
FIG. 2 is a graph showing the results of evaluating a change in complex viscosity by frequency for the polyethylene resin compositions of Examples and Comparative Examples.

The physical properties of the polyethylene resin compositions are summarized in Table 3 below. However, the result of evaluating a viscosity by shear rate is illustrated in FIG. 1, and the result of evaluating a change in complex viscosity by frequency is illustrated in FIG. 2:

TABLE 3

| | $MI_{2.16}$ (g/10 min) | $MI_5/MI_{2.16}$ | Density (g/cm$^3$) | Mw (g/mol) | Molecular weight distribution | Processing load (A) | Occurrence of die deposit | Bubble stability (Bur 1.2) |
|---|---|---|---|---|---|---|---|---|
| Example 1 | 0.76 | 3.72 | 0.952 | 120000 | 4.9 | 1.8 | X | Stable |
| Example 2 | 0.69 | 3.64 | 0.952 | 124000 | 4.7 | 1.8 | X | Stable |

TABLE 3-continued

|  | $MI_{2.16}$ (g/10 min) | $MI_5/MI_{2.16}$ | Density (g/cm³) | Mw (g/mol) | Molecular weight distribution | Processing load (A) | Occurrence of die deposit | Bubble stability (Bur 1.2) |
| --- | --- | --- | --- | --- | --- | --- | --- | --- |
| Example 3 | 0.60 | 3.73 | 0.955 | 132000 | 4.7 | 1.8 | X | Stable |
| Example 4 | 0.79 | 3.75 | 0.952 | 115000 | 4.9 | 1.8 | X | Stable |
| Example 5 | 0.58 | 3.76 | 0.952 | 134000 | 4.7 | 1.8 | X | Stable |
| Comp. Ex. 1 | 1.15 | 4.04 | 0.952 | 106000 | 9.6 | 1.2 | ○ | Unstable |
| Comp. Ex. 2 | 0.86 | 3.29 | 0.956 | 138000 | 6.3 | 2.0 | X | Stable |
| Comp. Ex. 3 | 1.14 | 2.91 | 0.954 | 122000 | 4.1 | 2.0 | X | Unstable |
| Comp. Ex. 4 | 0.80 | 3.54 | 0.954 | 120000 | 5.5 | 2.0 | X | Unstable |

As shown in Table 3 and FIGS. 1 and 2, it was confirmed that the resin compositions of Examples exhibited excellent processability and bubble stability as compared to Comparative Examples, since two types of polyethylene resins having specific physical properties were included therein.

Particularly, the compositions of Examples were evaluated to have a relatively low processing load compared to Comparative Examples, and to exhibit excellent processability due to no occurrence of die deposit as well as excellent bubble stability. In contrast, it was confirmed that Comparative Examples 1 and 4 in which two types of polyethylene resins having different physical properties from Examples were mixed, and Comparative Examples 2 and 3 using one polyethylene resin exhibited poor processability and/or bubble stability.

What is claimed is:

1. A polyethylene resin composition comprising
   a first polyethylene resin having a density of 0.950 g/cm³ to 0.960 g/cm³, a weight average molecular weight of 80000 g/mol to 150000 g/mol and a molecular weight distribution of 3.9 to 6.0; and
   a second polyethylene resin having a density of 0.950 g/cm³ to 0.960 g/cm³, a weight average molecular weight of 110000 g/mol to 300000 g/mol and a molecular weight distribution of 1.5 to 3.8.

2. The polyethylene resin composition of claim 1, wherein a weight ratio of the first polyethylene resin:the second polyethylene resin is 80:20 to 90:10.

3. The polyethylene resin composition of claim 1, wherein the composition has a density of 0.950 g/cm³ to 0.960 g/cm³, and a melt index ($MI_{2.16}$) of 0.5 to 0.9 measured at a temperature of 230° C. under a load of 2.16 kg in accordance with ISO 1133.

4. The polyethylene resin composition of claim 3, wherein the composition has a $MI_5/MI_{2.16}$ value of 3.5 to 4.0, which is obtained by dividing a melt index ($MI_5$) measured at a temperature of 230° C. under a load of 5.0 kg in accordance with ISO 1133 by the $MI_{2.16}$.

5. The polyethylene resin composition of claim 3, wherein the composition has a weight average molecular weight of 110000 g/mol to 150000 g/mol.

6. The polyethylene resin composition of claim 3, wherein the composition has a molecular weight distribution of 4.5 to 5.3.

7. A polyethylene resin film comprising the polyethylene resin composition according to claim 1.

8. The polyethylene resin film of claim 7, which is a cast film or a blown film.

9. A fiber comprising the polyethylene resin composition according to claim 1.

10. A method of preparing a fiber comprising the step of cutting and stretching the polyethylene resin film of claim 7.

11. The polyethylene resin composition of claim 1, wherein each of the first and second polyethylene resins is a copolymer of ethylene and an alpha olefin having 3 or more carbon atoms.

12. The polyethylene resin composition of claim 11, wherein the alpha olefin is propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or a mixture thereof.

\* \* \* \* \*